Oct. 28, 1930. E. F. ANNIS 1,779,458
AIR FILTER
Filed Oct. 18, 1926  3 Sheets-Sheet 2
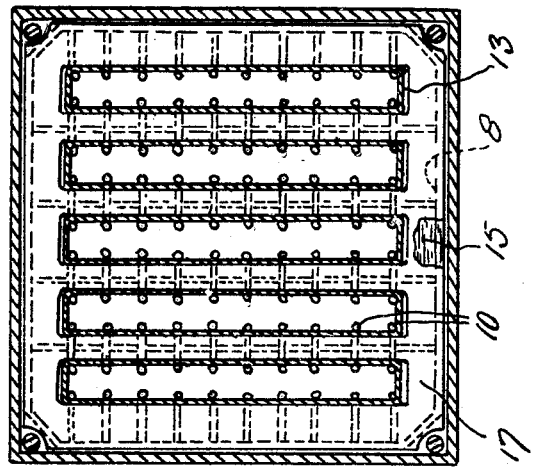
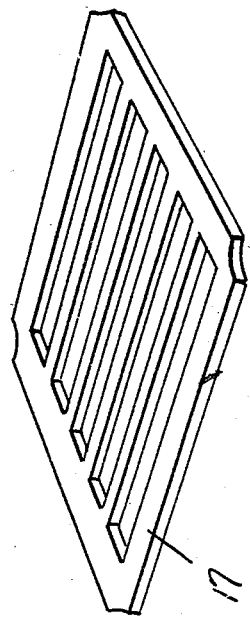
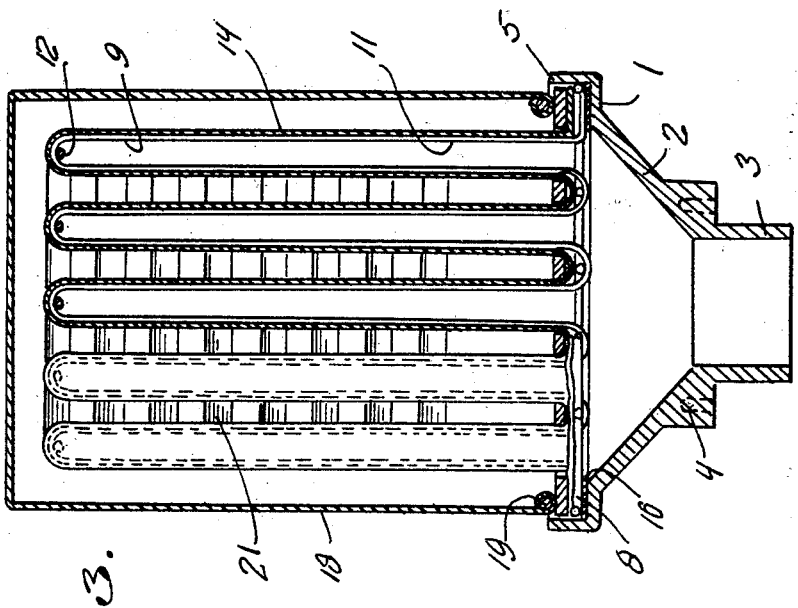
Inventor
*Emmett F. Annis,*
By *Clarence A. O'Brien*
Attorney Oct. 28, 1930.  E. F. ANNIS  1,779,458
AIR FILTER
Filed Oct. 18, 1926   3 Sheets-Sheet 3
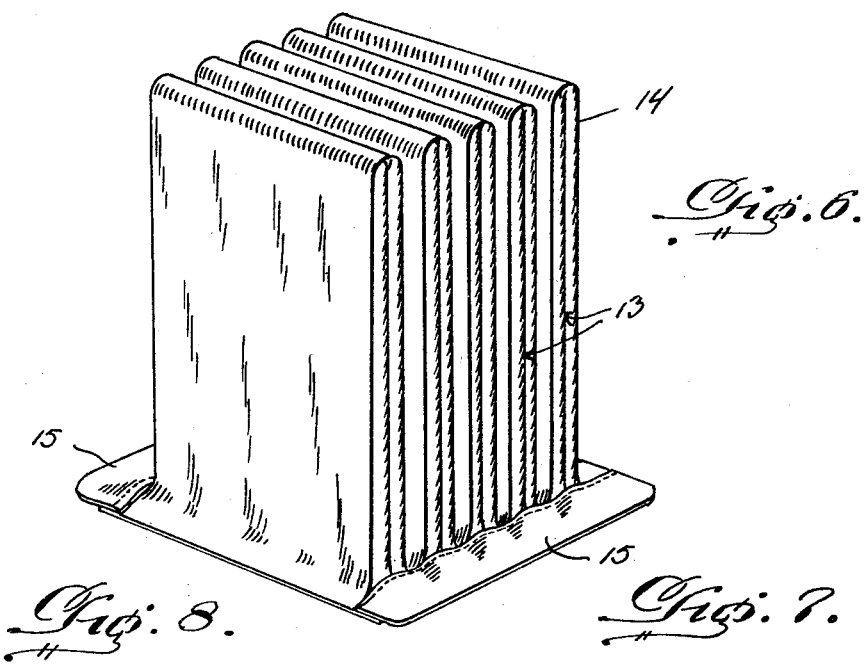
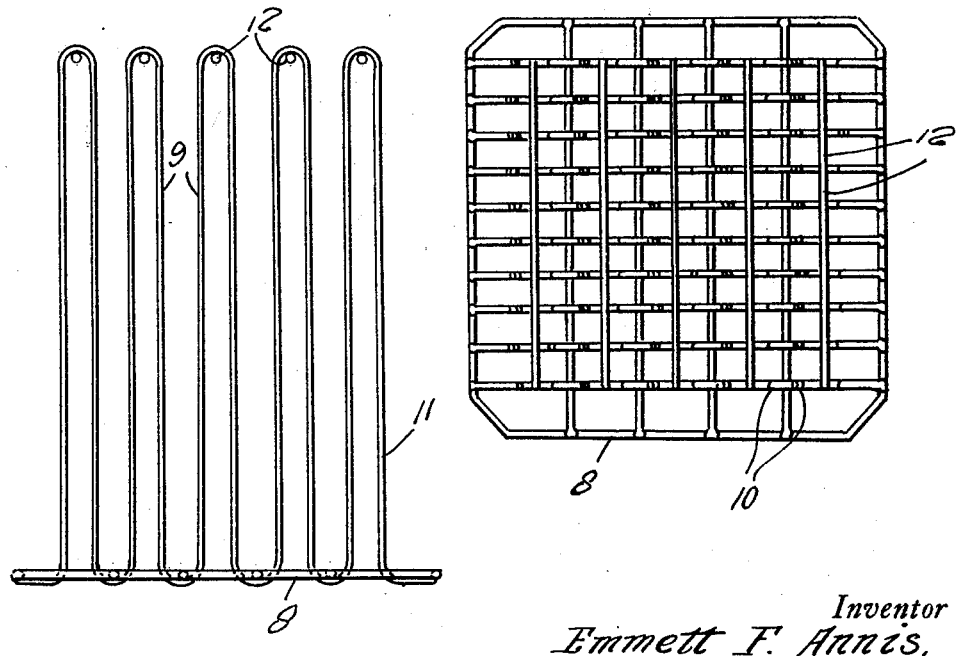
Inventor
Emmett F. Annis,
By Clarence A. O'Brien
Attorney Patented Oct. 28, 1930

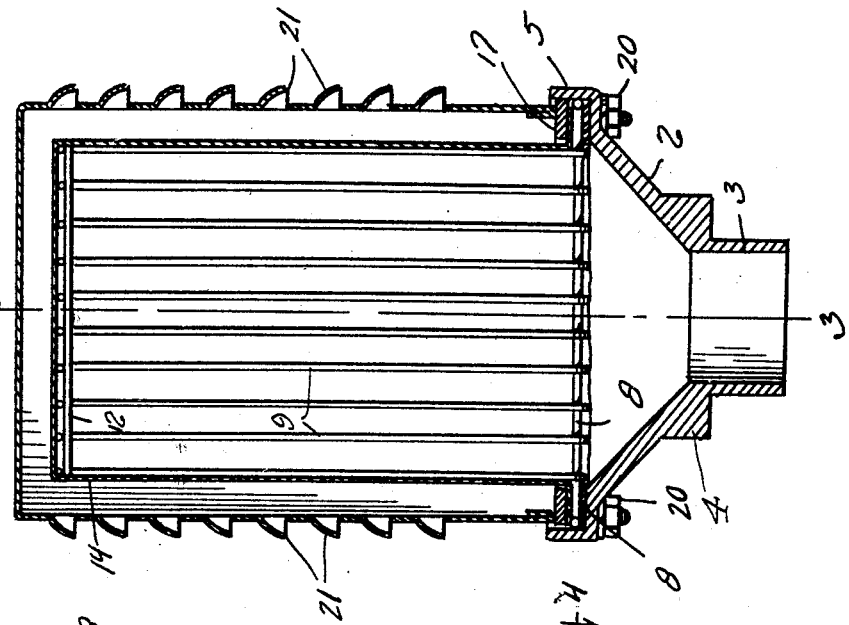
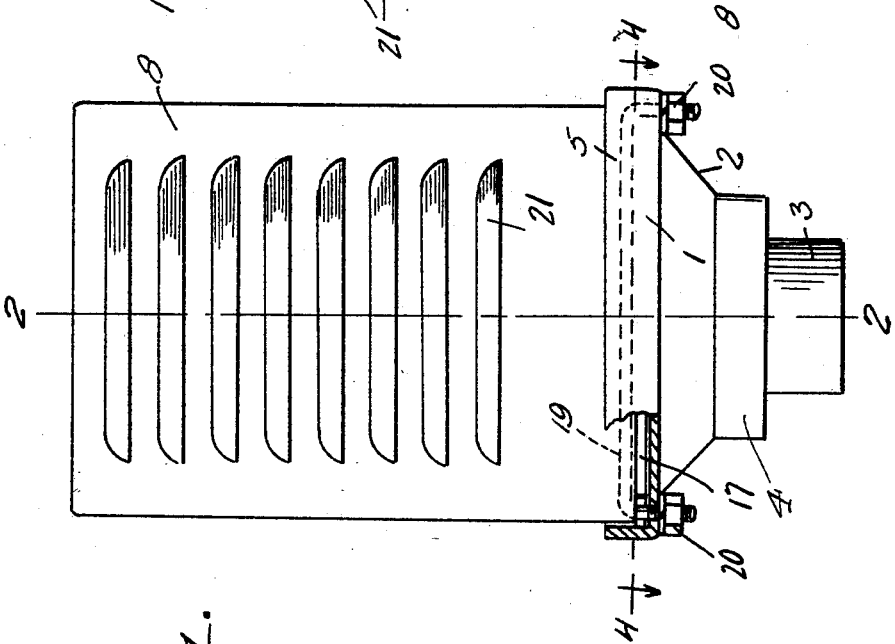

1,779,458

UNITED STATES PATENT OFFICE

EMMETT F. ANNIS, OF LOS ANGELES, CALIFORNIA, ASSIGNOR TO HARRY C. CHAPPELL, OF GLENDALE, CALIFORNIA

AIR FILTER

Application filed October 18, 1926. Serial No. 142,348.

This invention relates to improvements in air filters of a type particularly adapted for use in filtering air for carburation in internal combustion engines and the like, although it may be well adapted for application wherever it is desired to remove dirt and dust from air.

An object of the invention resides in improving the construction and relation of parts of an air filter in which a substantially large area of filter surface can be provided in a device of relatively small size having the parts associated in such a manner that they may be conveniently assembled, interchanged or replaced, and at the same time be capable of manufacture at a relatively small cost with high efficiency of operation.

The invention further comprehends the provision of a novel construction of filtering elements and support therefor by which the filtering elements may be readily manufactured from a single piece of sheet material and easily applied and removed from the supporting element.

The invention comprehends numerous other objects residing in the detailed construction and arrangement of the parts for carrying out the invention which are more particularly pointed out in the following detailed description and claims directed to the preferred form of construction, it being understood however that various changes in the size, shape, and arrangement of the parts may be made without departing from the spirit and scope of the invention as herein set forth.

In the drawings forming part of this application:

Figure 1 is a side elevation of the improved air filter with portions broken away.

Figure 2 is a vertical transverse section taken on line 2—2 of Figure 1.

Figure 3 is a vertical transverse section taken on line 3—3 of Figure 2 and substantially at right angles to the section of Figure 2.

Figure 4 is a horizontal sectional view taken on line 4—4 of Figure 1.

Figure 5 is a perspective of the retaining and spacer plate.

Figure 6 is a perspective of the filter element removed from the assembled structure.

Figure 7 is a bottom plan view of the wire supporting frame for the filter cloth.

Figure 8 is a side elevation of the wire supporting frame shown in Figure 7.

This improved filter construction includes a base 1 which as illustrated in the drawings is of rectangular form having the center portion of funnel shape as indicated at 2 terminating in the depending sleeve extension 3 which is adapted to receive the flexible conduit for connecting the filter with the air inlet end of an internal combustion engine carburetor. The funnel shaped portion 2 is provided with an enlarged portion at 4 which may be formed for receiving the end of a suitable bracket to which it may be attached for securing and supporting the air filter in any manner suitable in a motor vehicle or on an internal combustion engine of any character. The free edge of the base 1 is formed with the upstanding flange 5. This flange 5 cooperates with the edge portion of the base 1 to form a seat for the remaining element of the filter structure as will now be described.

A supporting frame for the filter element illustrated more clearly in Figures 6 and 7 includes a base frame 8 formed of a plurality of equally spaced parallel bars or wires secured together at their ends by welding or other suitable means to the end bars, which as illustrated are formed integral with the parallel bars at the opposite ends of said frame. A plurality of pocket supporting frames 9 are secured to the base frame 8 and extend in spaced parallel relation laterally from one side of said base frame. These pocket forming frames as illustrated in Figures 7 and 8 are formed by a plurality of wires or bars mounted in spaced parallel relation as indicated at 10 in which each bar is formed in zig-zag relation with a plurality of substantially parallel portions 11. These wires or bars are then secured at their free ends and at corresponding ends of each of the zig-zag portions to the base frame by suitable means such as welding or the like. Spacer wires or bars 12 are then secured to each of the plurality of wires 10 at the opposite ends of the parallel portions 11 as shown in Figures 7 and 8 to retain said end portions in proper spaced parallel relation and form the plurality of pocket supporting frames indicated by the numeral 9. While this method of construction has been found to be highly economical it is to be understood that other ways of forming and securing the pocket forming frames 9 to the base frame may be used which are within the scope of this invention.

A filter element 13, more clearly shown in Figure 6 is formed of a single strip of cloth which is doubled upon itself at a plurality of spaced points and the edges stitched together or otherwise suitably united to form a plurality of elongated pockets 14 open at one end where the portions of the strip intermediate the portions stitched together to form the pockets join the adjacent edges of adjacent pockets and form a single filter unit. Any suitable material of a porous nature which is adaptable for the purpose so that it will permit the passage of air with little resistance and yet receive and separate all the particles of dust and dirt therefrom.

Strips of the same material indicated at 15 are secured to the edges of the strips forming the filter element after the formation of the pockets and adjacent the open end of the pockets to provide a laterally extending flange from each side of the filter element in cooperation with the free ends of the strip so that the pocket portions may be suitably secured in assembled relation on the supporting frame.

This filter element constructed as above described as shown in Figure 6 is slidably mounted on the supporting frame, the pocket portions being extended over the frames 9 as illustrated in Figures 2 to 4, inclusive. In positioning the filter element on the supporting frame, the flanges and the open ends of the pockets terminate adjacent and against the base frame 8.

With the filter element positioned on the supporting frame, this assembled structure is then positioned in the seat formed on the base 1 by the flange 5 as shown in Figures 2 and 3 with the pocket portions extending upwardly, and with the base frame of the supporting frame seated on a suitable felt washer or the like indicated at 16.

A suitable retaining and spacer frame 17 formed of a plate member provided with a plurality of elongated parallel slots is then fitted over the filler element in its assembled relation on the supporting frame and moves downwardly to engage the strip 15 and the end portion of the strip 13 as well as the intermediate portions of the strip joining the free ends of the pockets for effectively drawing the pockets on the supporting frame and rigidly supporting said frame in assembled relation against the base 1.

A cover for the filter is indicated at 18, having the lower edges at a pair of opposite sides curved inwardly around a pair of U-shaped bolt members 19 as shown in Figures 1 and 3 to retain said bolt members in assembled relation with the cover and the free threaded end projecting downwardly from the corner portions thereof. The lower edge of the cover is adapted to seat against the upper face of the plate 17 around the edge portion thereof, while the free ends of the U-shaped bolts 19 are adapted to extend through openings in the base 1 to receive the nuts 20 thereon in threaded relation below the base.

The bolts 19 and the nuts 20 being assembled with the base 1 and through their attachment to the cover 18 serves to secure the cover, supporting frame, the filter element and plate 17 in rigid assembled relation on the base in the manner as shown in Figures 1 to 4 respectively. In this assembled relation of the parts the cover forms a complete enclosure for the filter element and the supporting frame above the base, the side walls being provided with suitably outstruck portions to provide louvers 21 to permit the entrance of air to the interior of the casing but to exclude moisture.

It has been found that a filter surface of a suitable porous coarse fabric must have a surface or area approximately fifty times the sectional area of the intake manifold in order to provide a sufficient filter surface for the air of an internal combustion engine to which the device is attached without unduly restricting the quantity of air drawn through the intake manifold or affecting the gasoline supply from the carburetor at varying speeds of the motor equipped with the device. With the construction as above set forth it has been found that the filter structure can be embodied in a unit of relatively small dimensions and yet have a filter area considerably greater than the required minimum area as above set forth. The U-bolts form a single assembling means for all the parts which have overlying flanges or edges seating within the flanged edge 5 of the base 1, and when tightened by the nuts 20 draw the cover toward the base to compress all of said overlying flanges into substantially air tight relation for effectively mounting the parts in proper relation.

The retaining and spacing plate 17 serves to cooperate with the wire supporting frame for holding the pockets in parallel spaced relation and preventing warping of the frame.

From the above description it will thus be clear that a highly novel and simple air filter construction has been provided wherein the filter element may be readily removed and replaced from the wire supporting frame and the parts may be easily disassembled and reassembled for the replacement of the filter cloth and cleaning of the filter.

It is to be understood that where the size of the filter construction as illustrated in the drawing is desired to be increased, that the base members and cover units may be doubled in size by increasing their lengths so as to receive two of the supporting members with the filter elements applied thereto. The cover and base member may be additionally increased to receive any number of the supporting frames and filter elements that may be desired, so that the construction of a uniform size filter element and wire supporting frame will permit the construction of filters of varying size in which these units will be interchangeable.

Having thus described the invention, what I claim as new and desire to secure by Letters Patent is:—

1. A filter, comprising a base, a reticulated supporting frame removably mounted on the base, a filter body slidably fitted on said frame and supported thereby in operative position, a spacing and retaining plate mounted over the filter body and frame, a cover for the filter, and means secured to said cover, plate, frame, filter body, and base to retain said elements in assembled relation.

2. A filter comprising an attaching base having an opening therein, a reticulated frame fitted over said opening and formed with a flange extending outwardly about its lower edge and adapted to rest upon one edge of said base, said frame including a plurality of spaced parallel rods extending transversely of said frame with the intermediate portions of the rods formed into a series of spaced parallel upstanding supporting members, the supporting members of the respective rods being arranged in alinement and adapted to receive a covering of fabric filtering material folded to form individual pockets over the alined supporting members, a spacing plate arranged at the base of said supporting members, a rigid cover having louvers formed in its walls fitted over said supporting member and attaching means engaging the flange of said frame, the fabric and rigid cover and said spacing plate for securing the parts in assembled position.

3. A filter comprising a base, a reticulated supporting frame mounted on the base, said frame including a plurality of rows of upright supports, a continuously formed filter cloth removably fitted over said rows of supports with portions of the cloth extending parallel with the uprights at opposite sides thereof whereby to form individual spaced pockets opening at the base, said cloth having its parallel edges at each end of the rows of supports secured to each other for closing the vertical edges of the pockets, and a retaining plate disposed in overlapping relation with the cloth at the open ends of the pockets; for securing the same in position on the base.

4. A filter comprising a base, a reticulated supporting frame mounted on the base, said frame including a plurality of rows of upright supports, a continuously formed filter cloth removably fitted over said rows of supports with portions of the cloth extending parallel with the uprights at opposite sides thereof whereby to form individual spaced pockets opening at the base, said cloth having its parallel edges at each end of the rows of supports secured to each other for closing the ends of the pockets, and a retaining plate having spaced parallel sections arranged to extend longitudinally of the rows of supports and seated upon the cloth at the base of each of said rows and at the ends of the cloth for securing the same in position on the base.

5. A filter comprising a base, a reticulated supporting frame mounted on the base, said frame including a plurality of rows of upright supports, a continuously formed filter cloth removably fitted over said rows of supports with portions of the cloth extending parallel with the uprights at opposite sides thereof whereby to form individual spaced pockets opening at the base, said cloth having its parallel edges at each end of the rows of supports secured to each other for closing the ends of the pockets, a retaining plate having spaced parallel sections arranged to extend longitudinally of the rows of supports and seated upon the cloth at the base of each of said rows and at the ends of the cloth for securing the same in position on the base and cloth extensions secured to the side edges of the filter cloth at the ends of the rows and also disposed to meet the retaining plate, said extensions being removable as a unit from the frame with said cloth.

6. A filter comprising a base, a reticulated supporting frame mounted on the base and including a plurality of spaced parallel rod members formed with successive return bends with the successive sections of the rods disposed in spaced parallel relation with each other and arranged to form rows of supports extending upwardly from the base, and a continuously formed filter cloth removably fitted over said rows of supports with portions of the cloth extending parallel with the support at opposite sides thereof, whereby to form individual spaced pockets opening at the base.

In witness whereof I affix my signature.

EMMETT F. ANNIS.